United States Patent [19]

Bagge

[11] Patent Number: 5,186,608
[45] Date of Patent: Feb. 16, 1993

[54] HYDRAULIC LOW PITCH SWITCH FOR PROPELLER PITCH CHANGE SYSTEM

[75] Inventor: William J. Bagge, East Longmeadow, Mass.

[73] Assignee: United Technologies Corporation, Hartford, Conn.

[21] Appl. No.: 782,835

[22] Filed: Oct. 25, 1991

[51] Int. Cl.$^5$ ............................................. F01D 7/00
[52] U.S. Cl. ........................................ 416/37; 416/61; 416/147; 416/157 R; 416/36
[58] Field of Search ............... 416/147, 156, 157 R, 416/157 A, 158, 162, 163, 164, 165, 36, 37, 61

[56] References Cited

U.S. PATENT DOCUMENTS

| | | | |
|---|---|---|---|
| 3,589,830 | 6/1971 | Mogren et al. | 416/1 |
| 3,820,917 | 6/1974 | Rakcevic | 416/157 |
| 3,873,235 | 3/1975 | Mendelson | 416/157 |
| 4,348,156 | 9/1982 | Andrews | 416/48 |
| 4,523,891 | 6/1985 | Schwartz et al. | 416/157 R |

FOREIGN PATENT DOCUMENTS 0214464 6/1957 Australia ........................... 416/36
0409552 1/1991 European Pat. Off. .

Primary Examiner—Edward K. Look
Assistant Examiner—Mark Sgantzos

[57] ABSTRACT

A low pitch alarm assembly 70 comprises a capped sleeve 72 disposed about the distal end 55 of the rotating and translating fluid delivery tube 50 so as to define a chamber 75 receiving the end 55 of the fluid delivery tube for axial translation therein, a fluid supply conduit 80, a pressure drop orifice 82 disposed in the fluid supply conduit 80, and a pressure switch 90 opening to the supply conduit downstream of the pressure drop orifice. The sleeve 72 has relatively large flow area outlet holes 74 opening through the capped end 76 of the sleeve 72 to a low pressure and a relatively small flow area inlet opening 73 through the sleeve side wall 78 connected to the fluid supply conduit 80. The pressure switch 90 generates an alarm signal whenever the end 55 of the fluid delivery tube 50 passes out of registration with inlet opening 73.

2 Claims, 3 Drawing Sheets

HYDRAULIC LOW PITCH SWITCH FOR PROPELLER PITCH CHANGE SYSTEM

TECHNICAL FIELD

This invention relates generally to pitch change systems for adjusting the pitch of a variable pitch propeller and, more particularly, to a low pitch switch means for providing an alarm signal indicating that the propeller blades are at a undesirably low pitch angle.

BACKGROUND ART

Conventional aircraft propeller systems typically incorporate a plurality of variable pitch propeller blades mounted to a rotary hub driven by the aircraft's engine, with each propeller blade extending radially outwardly from the hub along the longitudinal axis of the blade. In order to permit pitch adjustment, each blade is mounted to the hub for pivotable movement about its longitudinal axis. The hub typically encloses a chamber within its interior wherein a pitch change actuation system is disposed in operative association with the propeller blades. The actuation system functions to selectively change the pitch of the blades thereby altering air resistance to the rotation of the blades to thereby control engine speed.

Generally, the actuation system includes a pitch change actuator of the hydromechanical type wherein an output member, typically a piston, is driven in response to adjustments in the pressure of the hydraulic fluid which drives the actuator. The adjustments in fluid pressure are typically affected by either a hydromechanical or electronic control system which monitors engine speed and causes, by way of collateral apparatus, a change in pitch change fluid pressure whenever the monitored engine speed departs from the desired engine speed setting. To control blade pitch, the net pressure force exerted by the pitch change fluids selectively directed in response to a departure from desired engine speed against the opposite faces of the piston, that is the difference between the pressure force exerted by the fine pitch change fluid on one face of the piston and the pressure force exerted by the coarse pitch change fluid on the opposite face of the piston, is varied thereby causing a linear displacement of the piston and a resultant change in pitch of the blades operatively connected to the piston.

Typically, the fine and coarse pitch change fluids are delivered through independent conduits in an axially elongated tube assembly to opposite sides of the pitch change piston. For example, the fine pitch change fluid is delivered to a fine pitch fluid chamber adjacent the forward face of the pitch change piston and the coarse pitch change fluid to a coarse pitch fluid chamber adjacent the rearward face of the pitch change piston. The fluid delivery tube assembly, typically referred to as a torque tube, commonly comprises a pair of co-axially disposed tubes forming an annular fluid delivery conduit therebetween opening to one of the fluid chambers and an inner conduit within the interior of the inner tube opening to the other fluid chamber, the fine pitch change fluid being delivered through one of these conduits and the coarse pitch change fluid through the other conduit. The inner tube is mounted at its forward end to the propeller hub and the outer tube is mounted at its forward end to the pitch change piston whereby the outer tube not only rotates with the propeller hub but also translates axially with the pitch change piston, while the inner tube rotates with the propeller hub but does not translate with the pitch change piston.

In order to provide a feedback signal indicative of blade pitch setting to the controller that selectively meters the pitch change fluids, it is common practice to monitor the movement of the translating fluid delivery tube since this tube is attached to the pitch change actuator piston and moves therewith. It is well known in the art to utilize a linear variable differential transformer (LVDT) of conventional sliding armature/surrounding coil construction as a means of generating such a feedback signal indicative of the position of the translating tube of the fluid delivery assembly. Customarily, a pair of independent LVDT's are used to provide redundant feedback signals, each LVDT disposed axially parallel to the translating tube with its core mounted to the distal end a spring loaded shaft which in turn is operatively attached at its other end to the translating outer fluid delivery tube so as to translate therewith whereby the core reciprocates within a stationary cylinder housing the LVDT coils. The stationary cylinder is typically mounted to the non-translating tube of the fluid delivery assembly and houses a pair of axially spaced secondary coils and a primary coil disposed centrally therebetween. As the pitch change piston moves axially in response to a change in blade pitch, the translating outer fluid delivery tube will correspondingly move axially and the core of the LVDT will slide within the stationary cylinder, thereby causing the voltages induced in the secondary coils to change responsively. The difference between the voltages induced in the axially spaced secondary coils is indicative of the displacement of the core from its null position, i.e. a central position between the two axially spaced secondary coils. Thus, the LVDT measures the stroke of the pitch change piston and provides a feedback signal which is indicative of blade pitch setting.

As well appreciated in the art, it is desirable to provide an alarm signal to the controller whenever the propeller blades are positioned at an undesirably low pitch angle. In flight, the forces acting on the propeller blades are transmitted to the pitch change actuator and tend to drive the blades to a lower pitch angle unless balanced by a counteracting net pressure force of sufficient magnitude. Under normal circumstances, the controller is able to respond to the LVDT feedback signal indicative of blade position so as to modulate the coarse pitch pressure, or both the coarse pitch pressure and the fine pitch pressure, so as to increase the magnitude of the counteracting net pressure to compensate for the increase in blade loading in order to maintain the blades at a desired pitch setting. In the event of a failure or malfunction in the control system, for example such as a loss of hydraulic pressure, resulting in the inability of the controller to increase the net pressure force sufficiently to counteract the increased blade loading, the propeller blades will migrate to a finer pitch setting and, potentially, to an undesirable overspeed condition.

Accordingly, it is a common practice in the prior art to provide a mechanical low pitch switch in operative association with the torque tube which transmits an alarm signal to the controller in the event that the torque tube has translated beyond a preselected point in the fine pitch direction. Typically, the mechanical low pitch switch comprises a microswitch having an actuation lever which includes a wheel mounted at its distal end that rides on a cam member disposed about an anti-rotation rod for axial translation therealong. The cam member is mounted on an outer sleeve of a bearing assembly disposed about the torque tube such that the cam member translates with the torque tube but does not rotate with the torque tube. If the pitch change actuator is translated in a fine pitch direction under increasing blade loading beyond the preselected limit, the cam member translates with the torque tube to which it is mounted in the fine pitch direction and the wheel at the distal end of the actuation lever drops of the end of the cam member when the pitch change actuator passes beyond the preselected limit, thereby activating the microswitch to transmit a low pitch alarm signal to the controller to initiate emergency corrective action.

Conventional mechanical microswitches exhibit relatively low sensitivity as low pitch alarm switches. Thus, it is customary to build in a high margin of safety by designing the switch to activate at a pitch angle greater than the true low pitch limit. Furthermore, the bearing assembly and anti-rotation structure which is necessitated to ensure that the cam member with which the switch lever is operatively associated does not rotate with the torque tube, results in a cumbersome and unduly complicated mechanical system which requires frequent servicing and realignment checks.

DISCLOSURE OF INVENTION

It is an object of the present invention to provide a mechanically simple low pitch alarm apparatus exhibiting relatively high sensitivity.

It is also an object of the present invention to provide a hydraulic low pitch alarm assembly which responds rapidly to a change in hydraulic fluid pressure whenever the linear translation of the pitch change fluid delivery tube has exceed a preselected limit in the low pitch direction so as to generate a low pitch alarm signal.

It is a further object of the present invention to provide a low pitch alarm assembly incorporating a fluid pressure actuated low pitch switch operatively associated with the rotating and translating fluid delivery tube and functioning in response to a relatively precipitous change in hydraulic fluid pressure whenever the linear translation of the pitch change fluid delivery tube has exceed a preselected limit in the low pitch direction to transmit a low pitch signal to a control means for activating an emergency control system for modulating blade pitch at a fine pitch setting above the low pitch limit.

According to the present invention, a low pitch alarm apparatus for use in a propeller blade pitch change control system having an axially translating fluid delivery tube comprises a capped sleeve disposed about the rearward distal end of the fluid delivery tube and defining a chamber into which the distal end of the fluid delivery tube is received for axial translation therein, the sleeve having a relatively large flow area outlet opening therethrough from the chamber to atmospheric or drain pressure and a relatively small flow area inlet opening therethrough to an fluid supply conduit, a pressure switch opening to the fluid supply conduit and exposed to the fluid pressure therein, and a pressure drop orifice disposed in the supply conduit upstream of the pressure switch opening whereby the pressure within the supply conduit downstream of the pressure drop orifice modulates from a relatively high pressure when the fluid delivery tube is axially positioned within the sleeve in registration with the inlet opening thereto to a relatively low pressure when the fluid delivery tube is axially positioned within the sleeve out of registration with the inlet opening thereto. The pressure switch is adapted to generate and transmit an alarm signal whenever the pressure within the supply conduit downstream of the orifice drops from the relatively high pressure to the relatively low pressure thereby indicating passage of the propeller blades to a fine pitch angle below a preselected low pitch limit. In response to this alarm signal, a controller energizes an overspeed protection system to operative to maintain the blades at a fine pitch angle setting above the low pitch limit.

BRIEF DESCRIPTION OF DRAWING

The aforementioned objects, as well as other objects, features and advantages of the present invention will become more apparent in light of the detailed description of the embodiment thereof illustrated in the accompanying drawing, wherein.

BEST MODE FOR CARRYING OUT THE INVENTION

Figure 1:
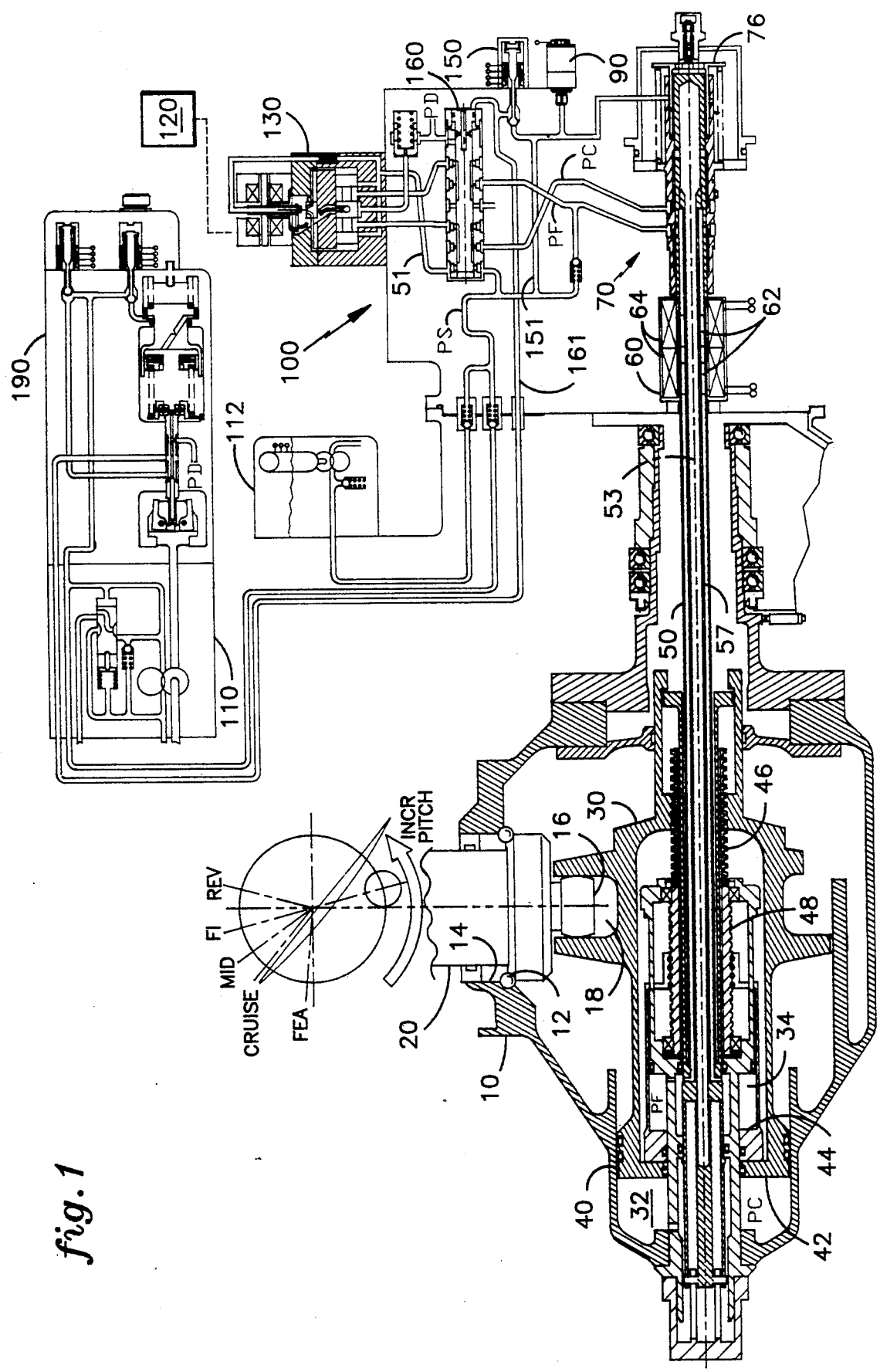
FIG. 1 is a partially sectioned, partly schematic, elevational view of a pitch change system incorporating the hydraulic low pitch alarm apparatus of the present invention.

The present invention is directed to a hydraulic low pitch alarm apparatus for use in a blade pitch change system for changing the pitch of the blades of a variable pitch propeller of the type used on propeller driven aircraft. As depicted in the FIG. 1, the propeller system includes a hub 10 into which a plurality of propeller blades 20, of which only one is shown, are mounted. Each blade is mounted at its root end on bearings 12 in an socket 14 in the disc end of the hub 10 so as to be pivotally adjustable for pitch change about its longitudinal axis.

An eccentric roller 16 extends outwardly from the lower end of the root portion of the blade 20 and is received within a cam slot 18 of a desired shape provided in a hydraulically actuated blade pitch change actuator 30 having an axially translatable actuation piston 40 which includes an axially elongated shaft extending rearwardly and threadably mounted on a pitchlock screw 46, and a pitchlock piston 44 mounted on a ballscrew 48. The blades 20 are operatively connected to the shaft of the actuation piston 40 of the pitch change actuator 30 such that an axial translation of the actuation piston 40 in one direction, in this case rearwardly (i.e. left to right in FIG. 1), accomplishes a change to a coarser, i.e. higher, blade pitch and in the other direction, in this case forwardly (i.e. right to left in FIG. 1), accomplishes a change to a finer, i.e. lower, blade pitch.

During normal operation, to effect a pitch change or maintain a desired pitch setting despite changing blade load, the axially translatable actuation piston 40 of the pitch change actuator 30 is selectively pressurized with a fluid such as hydraulic oil pumped from a fluid reservoir (not shown) via a main pump 110, or in the event of a malfunction of the main pump 110 via an auxiliary pump 112, as in conventional practice through a control valve 100 to and through a translating transfer tube 50, which also typically rotates, to be applied against the appropriate face of the actuation piston 40. The axial position of the actuation piston, which indicates the actual blade pitch, is continuously sensed and fed back to the electronic controller 120 by position feedback means operatively associated with the rotating and translating transfer tube 50 comprising a linear variable differential transformer (LVDT) assembly 60. Although the particular configuration of LVDT utilized is not limiting of the present invention, the LVDT 60 depicted in FIG. 1 comprises target means 62 of a material having magnetic permeability mounted to the rotating and translating fluid delivery tube 50 and a pair of independent stationary coil assemblies 64, each having a pair of axially spaced secondary coil windings and a primary coil winding disposed centrally therebetween, positioned coaxially about the fluid delivery tube so as to extend over the extent of travel of the magnet target. As the fluid delivery tube 50 translates with the blade actuation piston, the target translates axially within the surrounding stationary LVDT coil assemblies 64, whereby the voltages induced in the spaced secondary coils from the energized primary coil will vary relative to each other in response to the change in position of the magnetic target relative thereto. For each coil assembly 64, the difference between the voltages induced in the secondary coils constitutes the desired feedback signal indicative of the relative position of the pitch change piston and therefore the pitch setting of the blades, thus a pair of redundant feedback signals are generated. A more thorough description of this configuration of LVDT is presented in commonly-assigned, co-pending application Ser. No. 07/783,296 of the applicant filed on even date herewith, the entire disclosure of which is hereby incorporated by reference.

The axial position of the actuation piston 40, and therefore the pitch of the blades 20, is maintained at equilibrium at any desired pitch setting by balancing the net pressure force on the actuation piston 40 with the blade loading transmitted to the pitch change actuator 30, the net pressure force being the difference between the pressure force exerted by the coarse pitch change fluid supplied through the inner conduit 53 of the fluid delivery tube 50 to the coarse pitch fluid chamber 32 to act upon the forward face 42 of the actuation piston 40 and the counter acting pressure force exerted by the fine pitch change fluid supplied through the outer conduit 57 of the fluid delivery tube 50 to the fine pitch change fluid chamber 34 to act upon the pitchlock piston 44 of the pitch change actuator 30 to drive the pitchlock piston 44 against the rearward face of the actuation piston 40. The effective area of the forward face 42 of the actuation piston 40 is advantageously substantially greater than, for example approximately twice, the effective area of the face of the pitchlock piston 44. Thus, by adjusting the pressure of the coarse pitch fluid, the net pressure force on the actuation piston 40 may be readily balanced against any change in the blade loading force acting on the blade actuator 30 to drive the blades 20 to a finer pitch setting, thereby counteracting movement under the influence of an increase in blade loading to a finer pitch, thereby maintaining the blades at a desired pitch setting. Additionally, the magnitude of the net pressure can be readily varied by modulating the pressure of the coarse pitch fluid relative to the fine pitch fluid to increase or decrease the magnitude of the rearwardly acting net pressure force relative to the blade loading force so as to effect a desired translation of the actuation piston 40 and the pitchlock piston 44, together as a unit in back to back relation during normal operation, rearwardly or forwardly so as to drive the blades 20 to a different pitch setting.

As the low pitch alarm assembly of the present invention may be utilized with any configuration of the control valve 100, the particular configuration of the control valve 100 is not germane to the present invention. However, the blade pitch control system 100 may comprise a primary electrohydraulic valve (EHV) 130 controlled by the electronic controller 120, a protection EHV 160, and a protection solenoid 150 for transferring authority to the protection EHV 160 away from the primary EHV 130 in the event of a malfunction of the electronic controller 120, such as disclosed in commonly assigned copending application Ser. No. 07/743,943, filed Aug. 12, 1991, the entire disclosure of which is hereby incorporated by reference. The protection electrohydraulic valve 160 functions independently of the primary electrohydraulic valve 130 to assume control authority for feathering and for low pitch stop protection and overspeed protection in the event of an electrical failure. During normal operation, the protection EHV 160 functions solely as a conduit through which the coarse and fine pitch change fluids pass and does not in anyway interfere with the authority of the primary EHV 130 which is controlled by the electronic controller 120 to modulate the pressure of the coarse pitch fluid between a lower drain pressure, i.e. the pressure of a supply fluid reservoir (not shown), and a higher supply pressure, i.e. the pressure at which the fluid is received from the pump, while maintaining the pressure of the fine pitch fluid at higher supply pressure.

To effect a pitch change to a coarser pitch setting, the electronic controller 120 modulates the primary EHV 130 to increase the pressure of the coarse pitch fluid and meters pitch change fluid from supply conduit 51 at regulated pressure through a first pitch change fluid conduit 53 in the axially elongated transfer tube 50 to the coarse pitch fluid chamber 32 thereby increasing the pressure acting on the forward face 42 of the actuation piston 40 such that the net pressure force acting on the actuation piston 40 exceeds the blade loading, thus resulting in the pitch change actuator 30 being translated rearwardly to drive the blades 20 to a new coarser pitch. To effect a pitch change to a finer pitch setting, the electronic controller 120 modulates the primary EHV 130 to decrease the regulated pressure of the coarse pitch fluid, while still passing fine pitch change fluid at supply pressure through the second pitch fluid conduit 57 in the axially elongated transfer tube 50 to the fine pitch fluid chamber 34, thereby decreasing the pressure acting on the forward face 42 of the actuation piston 40 relative to the pressure acting on the rearward face of the pitchlock piston 44 such that the net pressure force acting on the actuation piston 40 is now exceeded by the blade loading, thus resulting in the pitch change actuator 30 being translated forwardly as the blades 20 are driven under the blade loading to a new finer pitch setting.

Except in the event of a failure, normal pitch change logic and scheduling is provided by the electronic controller 120 over the entire blade pitch envelope including in flight pitch control, ground pitch control including low pitch stop override and blade reversal, and emergency feathering. The electronic controller 120 may advantageously comprise a microprocessor programmed with all the pitch change logic necessary to control and schedule blade pitch over the entire operating range, such as for example a full authority digital electronic controller provided with redundant control channels and redundant inputs and outputs to provide added safety. On multi-engine aircraft, the electronic controller 120 may also be programmed to synchrophase the propellers in a conventional manner by biasing blade pitch between the propeller shipsets.

The primary EHV 130, which in the depicted embodiment comprises a conventional jet pipe EHV of the type well known in the art, is operatively connected to a torque motor 122 which is controlled by the electronic controller 120 in a conventional manner well known in the art to selectively port pressurized fluid from a supply conduit at a first fluid pressure, in this case a regulated pressure selectively modulated via the primary EHV over the range from drain pressure to supply pressure, to the coarse pitch fluid conduit 53 and at a second pressure, in this case at supply pressure, to the fine pitch fluid conduit 57 of the fluid delivery tube 50. The protection EHV 160 comprises a hydraulically actuated spool valve incorporating a spool having a smaller area end face which is continuously exposed to supply pressure fluid from supply conduit 51 and a larger area end face exposed either to a selectively variable pressure fluid passed through conduit 161 from an emergency overspeed governor 190 which has authority only in the event of failure of the electronic controller 120, or to supply pressure fluid from conduit 151 in the event that the protection solenoid 150 opens to allow supply pressure fluid to flow to the right end, i.e. the larger area end face, of the valve chamber to either effect emergency feathering of the blades or in response to a low pitch warning.

Emergency overspeed protection is also provided in the event of failure of the electronic controller 120, such as would occur in the event of complete electrical failure, by modulating the protection valve 160 through the regulated pressure signal produced by the emergency overspeed governor 190 and applied to the right end face of the spool thereof. Although depicted as a conventional mechanical overspeed governor of the type well known in the art and commonly employed in pitch change control systems, the emergency overspeed governor 190 may alternatively be an electrohydraulic overspeed governor of conventional type known in the art. The mechanical overspeed governor 190 operates in a manner well known to those skilled in the art to modulate the regulated pressure relative to the supply pressure. The overspeed governor 190 functions in conjunction with the protection valve 160, to position the blades to maintain engine speed within preselected limits, for example from 100% to 107% of normal rpm, during low blade pitch angle operation when the electronic controller 120 has failed to avoid an overspeed condition.

In accordance with the present invention, the low pitch alarm assembly 70 comprises a capped sleeve 72 disposed about the rearward end 55 of the rotating and translating fluid delivery tube 50 and defining a chamber 75 into which the rearward end of the fluid delivery tube is received for axial translation therein, a fluid supply conduit 80, a pressure switch 90 opening to the fluid supply conduit 80, and a pressure drop orifice 82 disposed in the supply conduit upstream of the pressure switch 90. The sleeve 72 has a relatively large flow area outlet, formed for example by a plurality of outlet holes 74 opening through the capped end 76 of the sleeve 72, connecting the chamber 75 in fluid communication with a low pressure, such as drain pressure or, preferably atmospheric pressure, and a relatively small flow area inlet opening 73 through the cylindrical side wall 78 of the sleeve 72 which is connected in fluid communication via flow passageway 77 to the fluid supply conduit 80.

The capped sleeve 72 is slidably mounted within a stationary, axially elongated cylindrical housing 66 which extends coaxially about the rearward end 55 of the fluid delivery tube 50 and the sleeve portion of the capped sleeve 72. The housing 66 is disposed within a second stationary outer cylinder 68 and a fluid flow passage 77 is provided therebetween through which fluid may flow from the fluid supply conduit 80 to and through the fluid inlet opening 73 in the sleeve 72. The capped sleeve 72 is advantageously selectively axially postponable within the housing 66 by adjustment of a positioning means operatively associated therewith, such as for example a bias spring 106 operatively associated with the end cap of the sleeve 72 to bias the sleeve 72 axially rearwardly and a threaded adjustment screw 108 disposed coaxially with and abutting against the end cap 76 of the sleeve 72. By selectively rotating the positioning screw 108 in one direction, the sleeve 72 may be pushed against the bias spring 106 further into the housing 66, that is further forwardly relative to the fluid delivery tube 50, or by selective rotation in the opposite direction may be urged by the bias spring 106 further out of the housing 66, that is further rearwardly relative to the fluid delivery tube 50. Accordingly, the relative axial position of the small flow area opening 73 in the sleeve 72 with respect to the end of the fluid delivery tube 50 may be selectively adjusted. By adjusting the axial position of the small flow area opening 73 along the length of travel of the end of the translating fluid delivery tube 50, the blade pitch angle at which the low pitch limit alarm will be activated may be selected.

The pressure drop orifice 82 disposed in the fluid supply conduit 80 upstream of the location of the opening of the pressure switch 90 to the fluid supply conduit 80 defines a fluid chamber 85 within the fluid supply conduit 80 comprising the region of the fluid supply conduit 80 extending from the pressure drop orifice 82 in a downstream direction to the flow passageway 77 to the small flow area inlet opening 73 in the sleeve 72. As will be explained further herein later, the fluid pressure within the chamber 85 is modulated between the relatively high supply pressure of the hydraulic fluid in the fluid supply conduit 80 upstream of the orifice 82 and the low pressure in the chamber 75 within the sleeve 72 which is open to drain or atmospheric pressure through the relatively large outlet flow area defined by the holes 74. The magnitude of the pressure drop across the orifice 82 in the fluid supply conduit 80, and consequently the magnitude of the chamber 85 in the supply conduit 80 downstream of the pressure drop orifice 82, varies in proportion to the amount of flow through the conduit 80. The greater the rate of flow of hydraulic fluid through the conduit 80, the greater the pressure drop experienced across the orifice 82 and the lower the fluid pressure within the chamber 85 downstream of the orifice 82.

The pressure switch 90 is of conventional design having a pressure responsive activation member 92 which is exposed to the modulated fluid pressure within the chamber 85 in fluid supply conduit 80. The pressure switch 90 is adapted in a manner well known in the art such that so long as the fluid pressure within the chamber 85 is maintained above a preselected threshold level, the activation member 92 remains in the off position and no alarm signal is generated, but when the fluid pressure within the chamber 85 drops below the preselected threshold pressure, the activation member 92 rapidly responds to activate the pressure switch 90 to generate an alarm signal.

Figure 2:
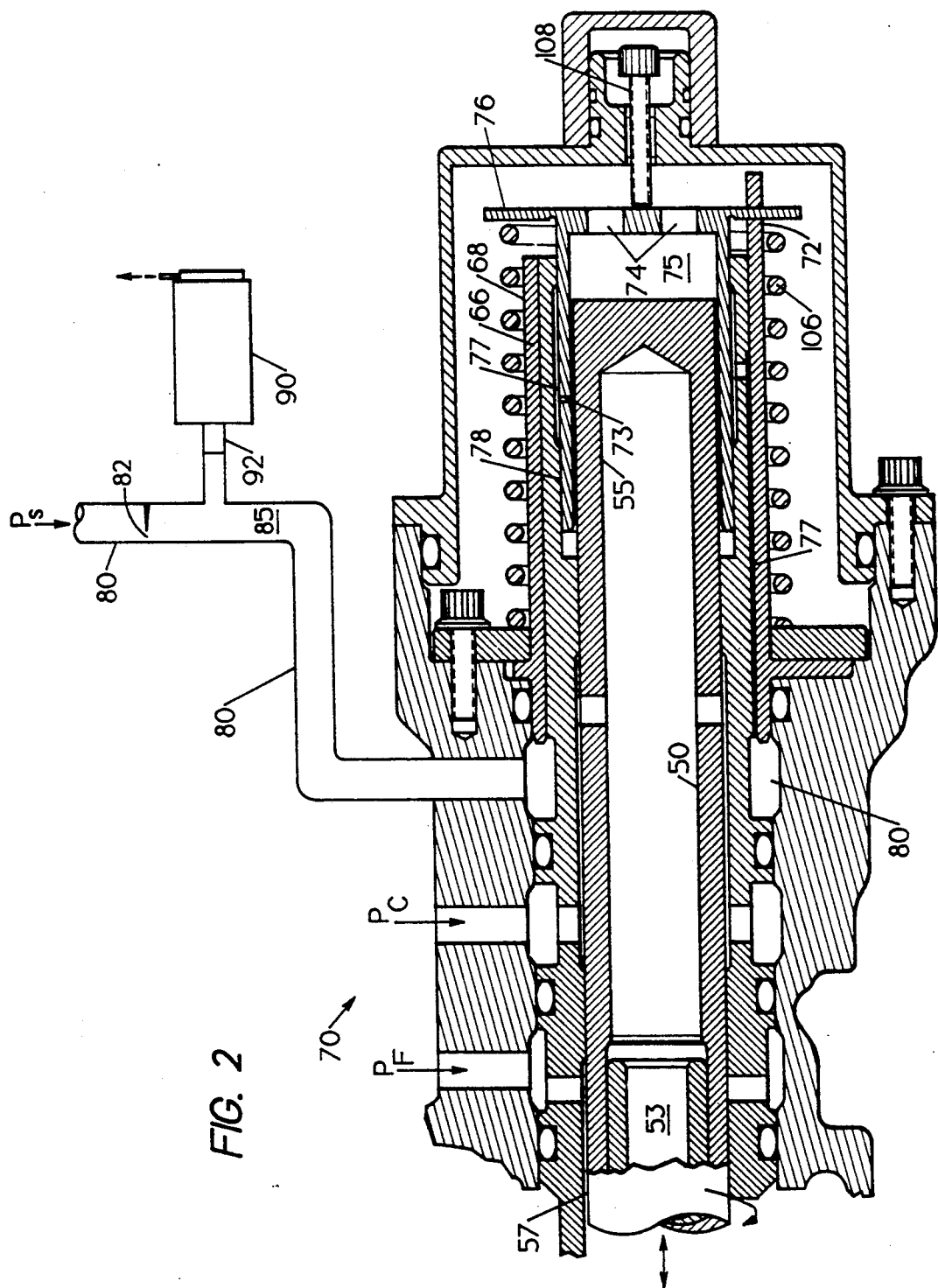
FIG. 2 is a sectioned, elevational view of the hydraulic low pitch alarm apparatus of the present invention as depicted in FIG. 1 during normal flight operation.

The rate of flow of hydraulic fluid through the fluid supply conduit 80 is determined by the rate of flow of hydraulic fluid through the small flow area inlet 73, for example a circular hole having a diameter of about 0.2 inches or less, in the sleeve 72 opening therethrough into the chamber 75 defined within the sleeve 72. During in-flight operation, the rearward end 55 of the rotating and translating fluid delivery tube 50 is received within the sleeve 72 and is axially translatable through the chamber 75 from a forward position whereat the blades of the variable pitch propeller are at the finest, i.e. lowest, desired in-flight blade pitch setting, and from a rearward position whereat the blades of the variable pitch propeller are at feather, i.e. the coarsest pitch setting. In accordance with the present invention, the small flow area inlet opening 73 in the sleeve 72 is located axially along the sleeve side wall 78 such that when the propeller blades 20 are at a pitch setting within the normal flight envelope the rearward end 55 of the fluid delivery tube 50 is in full registration with the fluid inlet opening 73 in the sleeve 72, as illustrated in FIG. 2, but when the propeller blades 20 reach a preselected low pitch setting limit the rearward end 55 of the rotating and translating fluid delivery tube 50 passes out of registration with the the fluid inlet opening 73 in the sleeve 72, as illustrated in FIG. 3.

When the pitch setting of the propeller blades 20 is within the normal flight envelope, the rearward end 55 of the rotating and translating fluid delivery tube 50 is disposed within the sleeve 72 sufficiently that it is continually in registration with the fluid inlet opening 73. In accordance with the present invention, a close clearance fit is maintained between the outer diameter of the rearward end 55 of the rotating and translating fluid delivery tube 50 and the inner diameter of the stationary surrounding sleeve 72 so that a small limited radial gap, for example less than about 0.010 inches, and advantageously from 0.002 to 0.006 inches, is maintained therebetween, thus restricting the flow of hydraulic fluid through the fluid supply conduit 80 and thence through the flow passage 77 and therefrom through the fluid inlet opening 73 in the sleeve 72 to a relatively low flow rate. Since the pressure drop across the orifice 82 is proportional to the rate of flow through the fluid supply conduit 80, the pressure drop experienced is quite small when the rearward end 55 of the fluid delivery tube 50 is in registration with inlet opening 73 in the sleeve 72. Consequently, the modulated fluid pressure in chamber 85 is relatively high, typically nearly equal to supply pressure, i.e. the fluid pressure upstream of the orifice 82, and therefore well above the threshold pressure at which the pressure switch 90 is activated, whenever the propeller blades 20 are positioned at a pitch setting within the normal flight envelope above the preselected lower limit of blade pitch angle.

Figure 3:
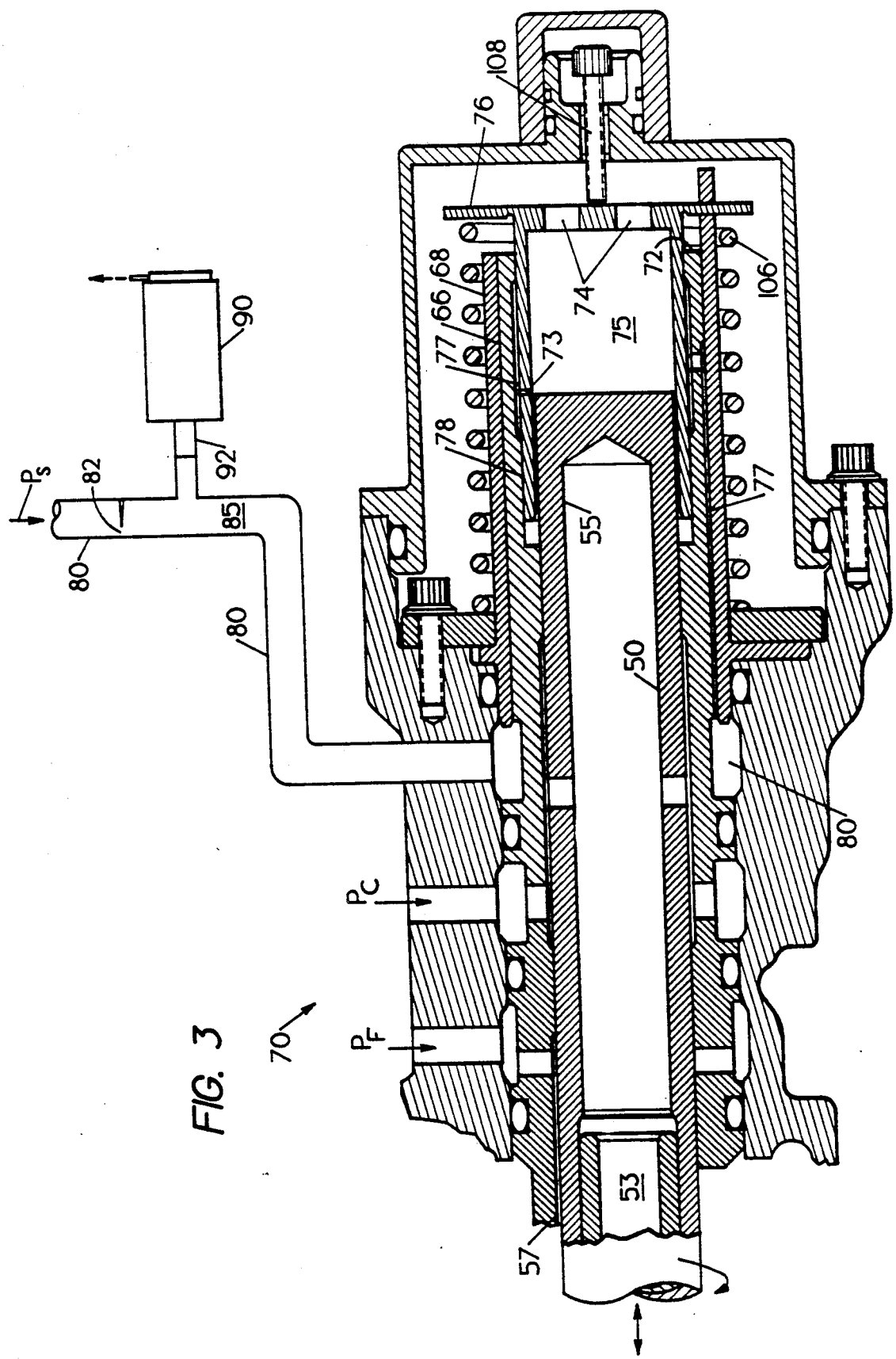
FIG. 3 is a sectioned, elevational view of the hydraulic low pitch alarm apparatus of the present invention as depicted in FIG. 1 in a low pitch alarm condition.

Referring now to FIG. 3, if the pitch setting of the propeller blades 20 is driven under increased blade loading to a fine pitch angle outside the normal flight envelope, that is below the preselected low pitch limit, the rearward end 55 of the fluid delivery tube 50 may still be disposed within the sleeve 72 but not sufficiently that it remains in registration with the fluid inlet opening 73. Rather, when the rotating and translating fluid delivery tube 55 moves forwardly with the pitch change actuator as the propeller blades migrate in the fine pitch direction, the rearward end 55 of the fluid delivery tube 50 translates axially forward past the fluid inlet opening 73 as the blades reach the low pitch limit. At this point, the rearward end 55 of the fluid delivery tube 50 is no longer in registration with the fluid inlet opening 73 and therefore no longer restricting the flow of hydraulic fluid through the fluid supply conduit 80 and thence through the flow passage 77 and therefrom through the fluid inlet opening 73 in the sleeve 72. With this restriction to fluid flow removed, the rate of flow of hydraulic fluid through the fluid supply conduit 80 and thence the flow passage 79 to and through the fluid inlet opening 73 in sleeve 72 into the open chamber 75 within the sleeve 72 increases dramatically and substantially to a relatively high flow rate as the chamber 75 is at the relatively low atmospheric or drain pressure.

Again, since the pressure drop across the orifice 82 is proportional to the rate of flow through the fluid supply conduit 80, the pressure drop experienced now becomes quite large as the rearward end 55 of the fluid delivery tube 50 is no longer in registration with inlet opening 73 in the sleeve 72 and no longer restricting the flow rate therethrough. Consequently, the modulated fluid pressure in chamber 85 drops relatively precipitously to a relatively low pressure, typically slightly above the pressure within the chamber 75, i.e. atmospheric or drain pressure, and therefore well below the threshold pressure at which the pressure switch 90 is activated, whenever the propeller blades 20 are positioned at a pitch setting outside the normal flight envelope, i.e. below the preselected lower limit of blade pitch angle.

The low pitch alarm assembly of the present invention is extremely responsive and sensitive in that a substantial drop in modulated fluid pressure within the chamber 85 will occur in a very short translation of the fluid delivery tube when the rearward end 55 of the fluid delivery tube 50 passes out of registration with the fluid inlet opening 73 thereby triggering the pressure switch 90 to generate the low pitch limit alarm signal. For example, the modulated fluid pressure will drop from a relatively high pressure near supply pressure, typically in the range of 450 to 700 psig, when the fluid delivery tube 50 is in registration with the fluid inlet opening 73 and thus restricting fluid flow, to a relatively low pressure, typically in the range 50 to 200 psig, when the fluid delivery tube 50 moves out of registration with the fluid inlet opening 73 and is no longer restricting fluid flow. This dramatic drop in the modulated fluid pressure in chamber 85 will typically occur in a generally linear manner over an axial translation on the order of about 0.03 inches or less and the magnitude of the drop will typically range from 300 to 600 psig, depending upon the width of the radial gap maintained between the outer diameter of the rearward end of the fluid delivery tube and the inner diameter of the sleeve 72 when they are in registration, the smaller that gap, the greater the magnitude of the drop in the modulated fluid pressure in chamber 85 as the rearward end 55 of the fluid delivery tube moves out of registration with the inlet opening 73.

By adjustment of the positioning screw 108 as hereinbefore noted, the sleeve 72 may be moved forwardly or rearwardly to adjust the axial position of the fluid inlet opening 73. The further forward that the inlet opening 73 is positioned along the length of travel of the rearward end of the fluid delivery tube 50 over the pitch envelope, the lower the low pitch limit and the further rearward the higher the low pitch limit at which the pressure switch 90 will activate to generate the low pitch alarm. Thus, the low pitch limit, i.e. the blade angle in the fine pitch direction beyond which the blades are not desired to move, may be preselected as desired.

Referring now to FIG. 1, in response to the modulated pressure within the chamber 85 dropping below the preselected threshold pressure, thereby indicating passage of the propeller blades to a fine pitch angle below a preselected low pitch limit, the pressure switch 95 generates and transmits an alarm signal to the controller 120 which in turn energizes the protection solenoid 150. Upon energization, the protection solenoid 150 opens conduit 151 to port supply pressure fluid to the larger area end face of the spool of the protection EHV 160, thereby shuttling the spool thereof to the left to block off flow of pitch change fluid through the protection EHV 160 from the primary EHV 130 and instead direct pitch change fluid from the overspeed governor 190 through the protection EHV 160 for direction to the pitch change actuator 30 to maintain the blades 20 at a fine pitch setting above the low pitch limit and thereby avoid an overspeed condition. Thus, in response to the low pitch alarm, control of blade pitch is effectively transferred from the electronic controller 120 and primary EHV 130 to the back-up overspeed governor 190 and the protection EHV 160. As noted before, the overspeed governor 190 functions, in a well known manner, in conjunction with the protection valve 160, to position the blades to maintain engine speed within preselected limits, for example from 100% to 107% of normal rpm, during emergency overspeed conditions when the electronic controller 120 has failed to avoid an overspeed condition.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A low pitch alarm apparatus for generating an alarm signal indicative of low blade pitch in a blade pitch change system utilizing a hydraulically actuated translating blade actuation piston to affect a change in pitch of at least one blade and having an axially disposed fluid delivery tube operatively associated at its proximate end with said blade actuation piston so as to translate therewith, said low pitch alarm apparatus comprising:

a. a fluid supply conduit for delivering a relatively high pressure fluid;

b. a pressure drop orifice disposed in an upstream portion of the fluid supply conduit;

c. pressure responsive means opening to the fluid supply conduit at a location downstream of said pressure drop orifice for generating an alarm signal whenever the fluid at an intermediate pressure in the fluid supply conduit downstream of said pressure drop orifice drops below a preselected pressure level;

d. an axially extending capped sleeve disposed about the distal end of the fluid delivery tube and defining a chamber for receiving the distal end of the fluid delivery tube for axial translation therein, said sleeve having a relatively large flow area outlet opening from said chamber to a relatively low pressure drain and a relatively small flow area inlet opening thereto to receive fluid at the intermediate pressure from the fluid supply conduit, the inlet opening in said sleeve being positioned relative to the distal end of the fluid delivery tube such that the distal end of the fluid delivery tube is in registration with the inlet opening whenever the at least one blade is at a pitch angle above a preselected low pitch limit and is out of registration with the inlet opening whenever the at least one blade is at a pitch angle below the preselected low pitch limit.

2. An apparatus as recited in claim 1 further comprising means for selectively positioning said sleeve axially relative to the distal end of the fluid delivery tube whereby the relative location at which the distal end of the fluid delivery tube goes out of registration with the inlet opening in said sleeve may be selectively adjusted to alter the preselected low pitch limit at which the pressure responsive alarm means is activated.

* * * * *